United States Patent [19]
Anderson et al.

[11] Patent Number: 4,733,767
[45] Date of Patent: Mar. 29, 1988

[54] LOW PROFILE AIRCRAFT BELT LOADER

[75] Inventors: James M. Anderson, Windermere; William C. Dean, Orange City, both of Fla.

[73] Assignee: FMC Corporation, Chicago, Ill.

[21] Appl. No.: 869,815

[22] Filed: Apr. 30, 1986

Related U.S. Application Data

[63] Continuation of Ser. No. 586,519, Mar. 5, 1984, abandoned.

[51] Int. Cl.$^4$ .............................................. B65G 41/00
[52] U.S. Cl. .................................. 198/304; 198/316.1; 198/318; 198/861.5
[58] Field of Search ...................... 198/300, 304, 316.1, 198/318, 861.1, 861.5; 180/308; 414/528

[56] References Cited

U.S. PATENT DOCUMENTS

| | | | |
|---|---|---|---|
| 2,359,889 | 10/1944 | Bigelow | 198/861 X |
| 2,428,513 | 10/1947 | Cooley | 198/300 |
| 3,098,574 | 7/1963 | De Marco | 180/308 X |
| 3,184,045 | 5/1965 | Fry | 198/316 |
| 3,370,667 | 2/1968 | Bishop | 180/308 X |
| 3,390,755 | 7/1968 | Stacy | 198/304 |
| 3,543,917 | 12/1970 | Duerksen | 198/316 X |
| 4,202,434 | 5/1980 | Herron | 198/316.1 |

FOREIGN PATENT DOCUMENTS 233194  8/1959  Australia ........................ 198/861.5

*Primary Examiner*—Joseph E. Valenza
*Assistant Examiner*—Jonathan D. Holmes
*Attorney, Agent, or Firm*—Ronald C. Kamp; Richard B. Megley

[57] ABSTRACT

An aircraft belt loader having electric motors to power the drive wheels and an electrically driven hydraulic pump for actuation of a hydraulic ram for elevation of a belt conveyor. A battery pack and the hydraulic compartment are positioned between the drive wheels and the steerable wheels and are spaced apart laterally to define a channel to accommodate the linkage including the hydraulic ram, supporting the conveyor.

1 Claim, 2 Drawing Figures

U.S. Patent   Mar. 29, 1988   4,733,767
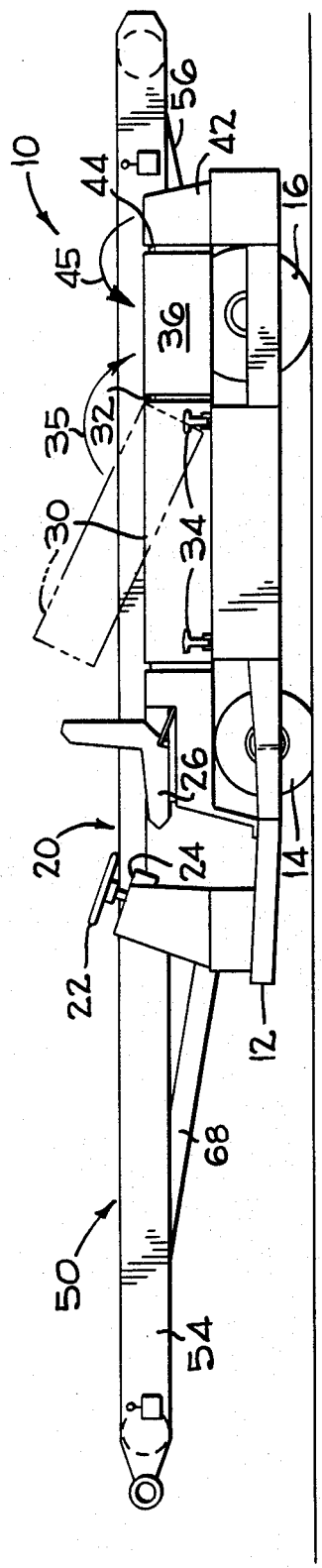
FIG_1
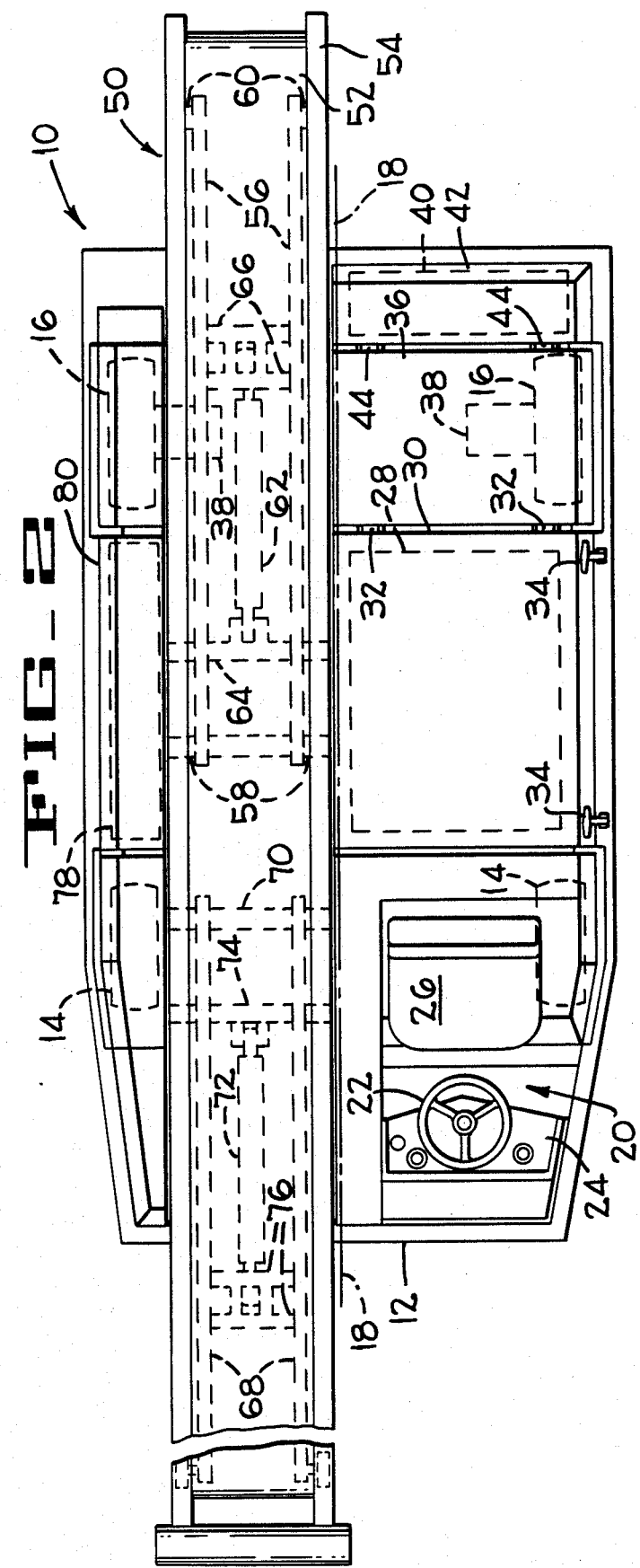
FIG_2

LOW PROFILE AIRCRAFT BELT LOADER

This application is a continuation of application Ser. No. 586,519, filed Mar. 5, 1984, now abandoned.

This invention relates generally to low profile belt loaders and, more particularly, to such loaders which are battery powered.

The present invention provides a battery powered aircraft belt loader which has a low profile, a particularly desirable attribute since machines of this type are operated in close proximity to the aircraft they service, which is relatively compact and which is arranged so that service and routine maintenance may be easily and quickly achieved. The arrangement of certain components provide a work platform usable by personnel tending the loader.

Other attributes and desirable features of the present invention will become readily apparent from the perusal of the following description and accompanying drawing wherein:

FIG. 1 is a side elevational view of an aircraft belt loader according to the present invention; and FIG. 2 is a top plan view of the aircraft belt loader shown in FIG. 1, but to a larger scale.

Referring to the drawing, an aircraft belt loader indicated generally at 10, includes a frame 12 which is supported by a pair of steerable wheels 14 near its forward end and a pair of drive wheels 16 near its rearward end. The frame 12 has a longitudinal or fore and aft center line, in plan view, as shown at 18 in FIG. 2. An operator station, indicated generally at 20, is positioned to one side of the center line and forward of the steerable wheel on that side and includes a steering wheel 22, instrument and control panel 24, and a seat 26. A battery pack 28, which is the power source for the loader 10, is supported by the frame 12 and is positioned on the same side of the center line 18 as, and just behind, the operator station 20. The pack 28 substantially fills the space between the drive and steerable wheels from the center line 18 to the outboard edge of the loader. A battery cover 30 is hinged at 32 to pivot about an axis transverse to the center line 18. Releasable latches 34 hold the cover 30 in its closesd position, as indicated in FIG. 1. When latches 34 are released, the cover 30 may be pivoted about hinges 32, as indicated by arrow 35 in FIG. 1, to lay against the adjacent wheel panel 36, which wheel panel covers the drive wheel 16 and its associated drive motor 38. The electrical controls for switching and voltage control between the battery pack 28 and drive motors 38 are contained within a control compartment 40 which is provided with a cover 42 hinged at 44 to pivot, as indicated by the arrow 45 in FIG. 1, about an axis transverse to the center line 18. The upper surfaces of the battery cover 30, the wheel panel 36 and the control cover 42 lie in substantially the same horizonal plane and thereby provide a level platform for use by personnel working on or around the loader 10.

A belt conveyor indicated generally at 50 includes a driven belt 52 mounted on a conveyor frame 54. A rear lift link 56 is pivoted to the loader frame 12 by pivot tube 58 and is pivoted to the conveyor frame by pin 60. A rear lift cylinder 62 has its head end pivotally attached to a cross member 64 and its rod end pinned to the cross members 66 affixed between the arms of link 56. Extension of the cylinder 62 will cause the rearward end of the conveyor 50 to be elevated, and retraction will lower it. A front lift link 68 is also pivotally attached to the loader frame 12 through pivot tube 70 and to the forward end of conveyor frame 54 by means of rollers trapped in oppositely facing channels (not shown) carried by the conveyor frame. A front lift cylinder 72 has its head end pivotally attached to the frame 12 through cross tube 74 and its rod end pivotally attached to the cross members 76 secured between the arms of link 68. Similar to the rearward end, extension and retraction of cylinder 72 will result in raising and lowering the forward end of belt conveyor 50. Because the drive wheels 16 are powered by individual electric motors 38, there is no rear axle transversing the frame 12 and the hydraulic cylinder 62 may be placed as low as possible, consistent with strength and moment arm relationships necessary to achieve pivoting of rear link 56 about tube 58. The hydraulic system, i.e., the hydraulic pump, reservoir, relief valve, tubing, as well as the electric motor for driving the pump, is placed in the hydraulic compartment 78 which is positioned between the wheels 14 and 16 and outward of the conveyor 50 substantially filling the space. A cover 80 encloses the compartment 78 and may also be used as a step or walkway by personnel.

As will be appreciated from the foregoing description, the present invention provides a relatively compact arrangement for the components of an electric drive aircraft belt loader which permits service and inspection of the battery and electrical controls without interference from the belt conveyor. The covers for these components in conjunction with the panel for the drive wheel on that side provide a wide platform for personnel to use in tending the belt and its contents. By positioning the battery on one side of the machine's fore and aft center line, a channel or depression is formed to accept the conveyor lift linkage when it is fully lowered. This achieves a low profile for the loader. In short, the arrangement of the major components provides an aircraft belt loader with those attributes necessary or desirable on such a machine.

While a preferred embodiment of the present invention has been shown and described herein, various modifications and changes may be made therein without departing from the spirit of the invention as defined by the scope of the appended claims.

What is claimed is:

1. An aircraft belt loader comprising:
 a frame having a longitudinal center line;
 a steerable wheel on each side of said center line for supporting the front end of said frame;
 a drive wheel on each side of said center line for supporting the rear end of said frame;
 an electric motor connected to drive each of said drive wheels;
 a battery pack connected to power said electric motors and supported on said frame on one side of said center line;
 a hydraulic compartment including a hydraulic reservoir, pump and drive motor positioned on the other side of said center line;
 said hydraulic compartment, battery pack, electric motors and drive wheels having covers with upper surfaces in substantially the same plane;
 said wheels on said other side and said hydraulic compartment being laterally spaced from said battery pack and said wheels on said one side to define a channel depressed relative to said upper surface's and extending the length of said loader;

a belt conveyor aligned with and receivable within said channel;

rear link means having a forward end pivotally attached to said vehicle frame and a rearward end pivotally attached to said conveyor;

a rear hydraulic ram pivotally attached to said frame within said channel and to said rear link means;

a front link means having a rear end and a front end, said rear end being pivotally attached to said frame within said channel adjacent the rear link means;

roller means connecting the front end of said front link means to said conveyor; and a front hydraulic ram pivotally attached to said frame within said channel and to said front link means.

* * * * *